United States Patent
Ray, Sr.

(10) Patent No.: US 11,319,704 B1
(45) Date of Patent: May 3, 2022

(54) FIRE RESISTANT PANEL MEMBER AND METHOD FOR PRODUCING A FIRE RESISTANT PANEL MEMBER

(71) Applicant: Talon Products LLC, Bristol, IN (US)

(72) Inventor: Donald Craig Ray, Sr., Fremont, IN (US)

(73) Assignee: Talon Products LLC, Bristol, IN (US)

( * ) Notice: Subject to any disclaimer, the term of this patent is extended or adjusted under 35 U.S.C. 154(b) by 34 days.

(21) Appl. No.: 16/880,373

(22) Filed: May 21, 2020

(51) Int. Cl.
| | |
|---|---|
| *B29C 70/54* | (2006.01) |
| *B29C 70/30* | (2006.01) |
| *E04B 1/94* | (2006.01) |
| *B32B 5/02* | (2006.01) |
| *B32B 5/26* | (2006.01) |

(52) U.S. Cl.
CPC .............. *E04B 1/942* (2013.01); *B29C 70/30* (2013.01); *B29C 70/544* (2021.05); *B32B 5/022* (2013.01); *B32B 5/26* (2013.01); *B32B 2260/023* (2013.01); *B32B 2307/3065* (2013.01); *B32B 2307/54* (2013.01); *B32B 2307/546* (2013.01); *B32B 2315/085* (2013.01)

(58) Field of Classification Search
None
See application file for complete search history.

(56) References Cited

U.S. PATENT DOCUMENTS

2017/0225429 A1    8/2017   Yu et al.

*Primary Examiner* — Christopher T Schatz
(74) *Attorney, Agent, or Firm* — Price Heneveld LLP

(57) ABSTRACT

A fire resistant panel member and a related method for producing a fire resistant panel member where the panel member includes a first layer, a second layer covering at least a portion of a surface of the first layer, the first and second layers each comprising a pigmented polyester resin and a first organic peroxide, a third layer covering at least a portion of a surface of the second layer, a substantially rigid core member covering at least a portion of a surface of the third layer, and a fourth layer covering at least a portion of a surface of the core member, the third and fourth layers each comprising a polyester resin, a flame retardant, a second organic peroxide, and a fiber material, wherein the panel member is configured to have an ASTM E84 Class I fire and smoke rating.

27 Claims, 2 Drawing Sheets

FIRE RESISTANT PANEL MEMBER AND METHOD FOR PRODUCING A FIRE RESISTANT PANEL MEMBER

BACKGROUND OF THE INVENTION

The embodiments as disclosed herein relate to a fire resistant panel member and a method for producing a fire resistant panel member, and in particular, a fire resistant panel member for use in laboratories and clean rooms.

SUMMARY OF THE INVENTION

One aspect may include a method for producing a fire and smoke resistant panel member that includes providing a mold, applying a first layer to at least a portion of a surface of the mold, the first layer including a first pigmented polyester resin and a first organic peroxide, and applying a second layer to at least a portion of a surface of the first layer, the second layer including a second pigmented polyester resin and a second organic peroxide. The method may further include applying a third layer to at least a portion of a surface of the second layer, the third layer including a first polyester resin, a first flame retardant, a third organic peroxide, and a first fiber material, applying a substantially rigid core member to at least a portion of a surface of the third layer, and applying a fourth layer to at least a portion of a surface of the core member, the fourth layer including a second polyester resin, a second flame retardant, a fourth organic peroxide, and a second fiber material, wherein the panel member is configured to have an ASTM E84 Class I fire and smoke rating.

Another aspect may include a method for producing a fire and smoke resistant panel member that includes providing a mold, applying a first layer to at least a portion of a surface of the mold and second layer to at least a portion of a surface of the first layer, the first and second layers each comprising a pigmented polyester resin and a first organic peroxide, providing a substantially rigid core member, and applying a third layer to at least a portion of a surface of the second layer and a fourth layer to at least a portion of a surface of the core member, the third and fourth layers each including a polyester resin, a flame retardant, a second organic peroxide, and a fiber material. The method may also include applying the core member to at least a portion of a surface of the third layer before applying the fourth layer to the core member, wherein the panel member is configured to have an a maximum flame spread index of less than or equal to 25 and a smoke development index of less than or equal to 450.

Another aspect may include a fire and smoke resistant panel member that includes a first layer, a second layer covering at least a portion of a surface of the first layer, the first and second layers each comprising a pigmented polyester resin and a first organic peroxide, a third layer covering at least a portion of a surface of the second layer, a substantially rigid core member covering at least a portion of a surface of the third layer, and a fourth layer covering at least a portion of a surface of the core member, the third and fourth layers each comprising a polyester resin, a flame retardant, a second organic peroxide, and a fiber material, wherein the panel member is configured to have an ASTM E84 Class I fire and smoke rating.

The inventive embodiments as disclosed herein provide a fire resistant panel member, and in particular, a laboratory wall panel member having significant fire resistance, substantial rigidity for use as a structural component particularly in building construction, is substantially thin, provides an aesthetic surface that may be selected to match a particular laboratory, office, or vehicle application, and is particularly well adapted for the proposed uses.

These and other features, advantages, and objects of the present invention will be further understood and appreciated by those skilled in the art by reference to the following specification, claims, and appended drawings.

DETAILED DESCRIPTION

Figure 1:
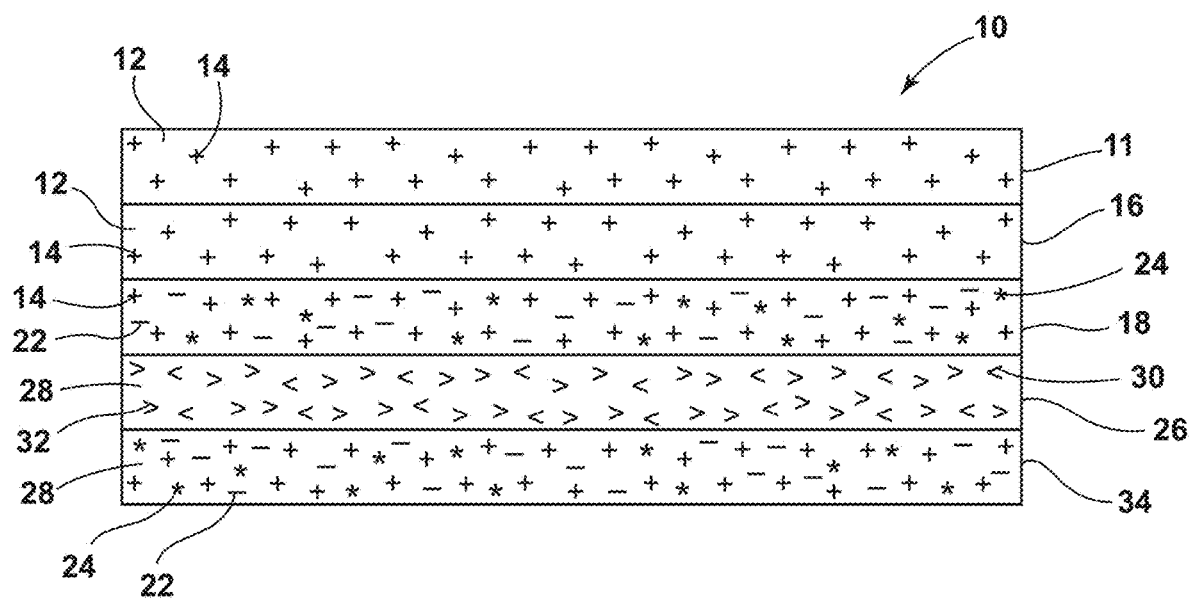
FIG. 1 is a schematic cross-sectional side elevation view of a fire and smoke resistant panel member.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Reference number 10 (FIG. 1) generally designates a fire and smoke resilient panel, and in particular, a laboratory wall panel member that includes a plurality of fire-resistant layers cooperating to form the overall panel 10 that is configured to meet certain fire and smoke resistance rating and standards. In the illustrated example, the fire and smoke resistant panel 10 includes a first layer 11 that may comprise a pigmented polyester resin that includes a fire retardant pigmented polyester resin 12 and a catalyst material such as an organic peroxide 14 as represented by the symbol "+", a second layer 16 comprising the fire retardant pigmented polyester resin 12 and the organic peroxide 14, a third layer 18 that may comprise a non-pigmented polyester resin 20, a flame retardant 22 represented in FIG. 1 by the symbol "−", the organic peroxide 14, and a fiber material 24 represented in FIG. 1 by the symbol "*". The panel member 10 may further include a substantially rigid core member 26 that may comprise a thermoplastic material 28, a flame retardant material 30 represented in FIG. 1 by the symbol "<", and a fiber reinforcement material 32 represented in FIG. 1 by the symbol ">", and a fourth layer 34 that may include the thermoplastic material 28, the flame retardant 22, the organic peroxide 14, and the fiber material 24. The third and fourth layers 18, 34 may also include an inert filler such as mica. It is noted that the various materials as illustrated in FIG. 1 may or may not be visible or separable as individual components, and that the symbols as used in FIG. 1 represent constituents of composites of the overall layers 11, 16, 18, 34, and fiber resistant panel 10. Further, while the layers 11, 16, 18, 34 and the core member 26 are illustrated in FIG. 1 in a particular order, other configurations and positions of the layers 11, 16, 18, 34 and the core member 26 with respect to one another may also be utilized, including providing additional layers thereto, or rearranging the various layers 11, 16, 18, 34 as disclosed.

Figure 2:
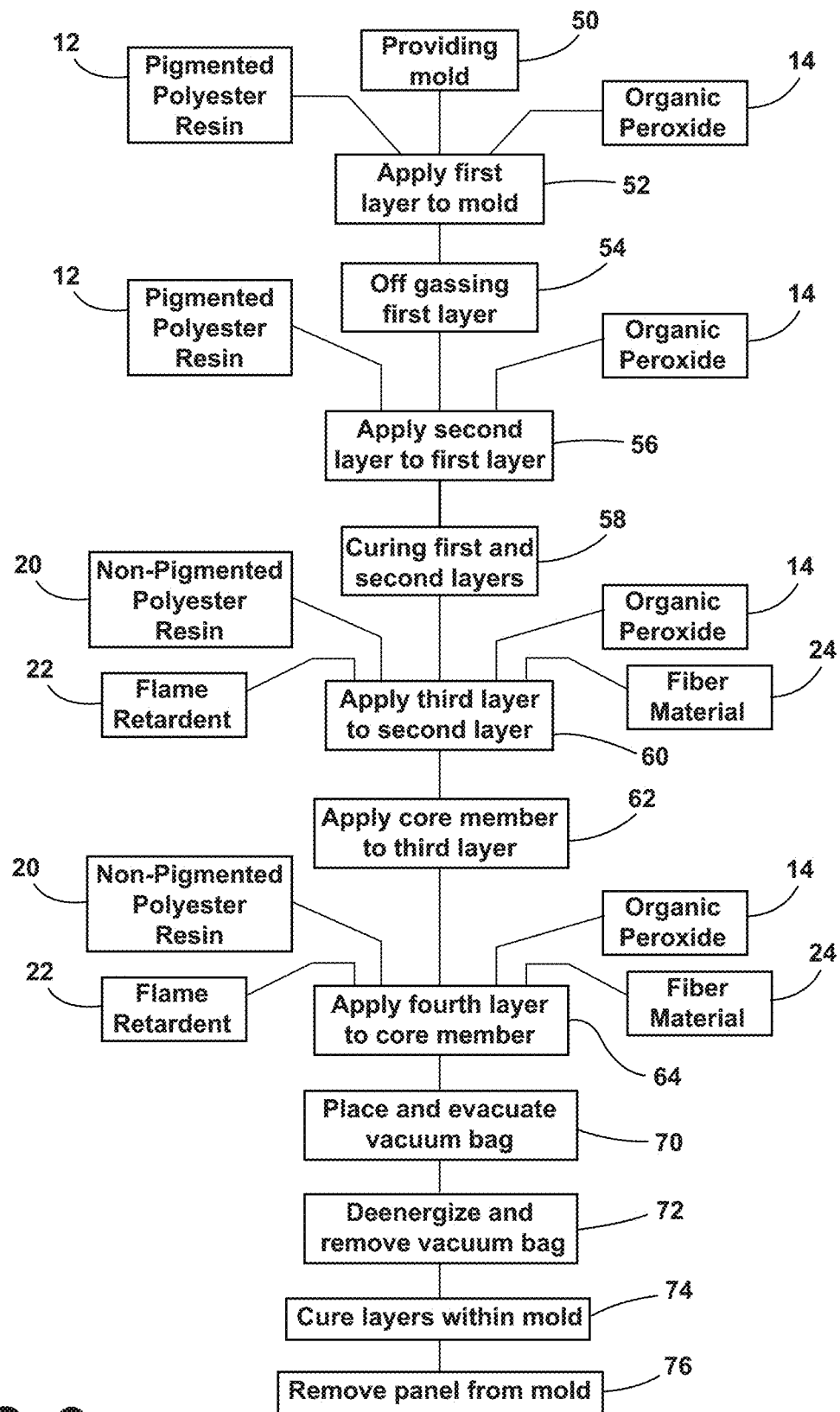
FIG. 2 is a flow diagram of a method for producing a fire and smoke resistant panel member.

A method for producing the fire resistant panel member 10, as schematically represented in FIG. 2, may include forming each of the layers 11, 16, 18, 34 sequentially on a mold. The method may include providing the mold 50, applying the first layer to at least a portion of the surface of the mold 52, off gassing the first layer 54, applying the second layer to at least a portion of a surface of the first layer 56, curing the first and second layers 58, applying the third layer to at least a portion of a surface of the second layer 60, applying the core member to at least a portion of a surface of the third layer 62, and applying the fourth layer to at least a portion of a surface of the core member 64. The application of the first layer 52, the application of the second layer 56, the application of the third layer 60, and the application of the fourth layer 64 may be accomplished by spraying the layer onto the respective receiving surface in a liquid state via a pressurized spraying apparatus such as a spray nozzle. The respective constituents of each layer 11, 16, 18, 34 may be mixed within the gun of the spray nozzle, or may be premixed prior to reaching the spray gun and/or the spray nozzle.

The pigmented polyester resin 12 of the first layer 11 and the second layer 16 may have a viscosity preferably within a range of between about 3900 cps and about 5100 cps, and more preferably of about 4500 cps; a Brookfield RV4/20 RPM thixotropic index preferably within a range of about 5.5 to about 8.5, and more preferably of about 7.0; a film cure time preferably within a range of between about 25 minutes and about 35 minutes, and more preferably of about 30 minutes; and a hide thickness preferably within a range of between about 8 mills and about 12 mills, and more preferably of about 10 mills. The pigmented polyester resin 12 may be configured to meet ASTM E84 Class I flame spread and smoke development requirements, such as that as available as Enguard™ FR Series Fire Retardant Gel Coat from Ashland Composites. The first layer 11 may be off gassed 54 prior to applying the second layer to the first layer 56, and the first and second layers may be cured 58 prior to applying the third layer to the second layer 60. The non-pigmented polyester resin 20 preferably has a Brookfield, #2 spindle at 30 RPM viscosity preferably within a range of between about 475 cps and about 550 cps, and more preferably of about 512.5 cps; a thixotropic index per ASTM D1824 preferably within a range of between about 2.5 and about 3.1, and more preferably of about 2.8; a specific gravity preferably within a range of between about 1.14 gm/cc and about 1.8 gm/cc, and more preferably of about 1.16 gm/cc; and a gel time preferably within a range of between 21 minutes and about 28 minutes, and preferably of about 25 minutes. The non-pigmented polyester resin 20 may be configured to meet ASTM E84 Class I flame spread and smoke development requirements, such as that as available as HETRON™ FR 650 Series Flame Retardant Resins from Ashland Composites.

The organic peroxide 14 is an organic compound containing a peroxide functional group, such as that available from AkzoNobel under the product name Cadox® L-50a.

The flame retardant 30 may comprises antimony pentoxide preferably of about 40% by weight. The flame retardant 30 may further comprise about 15% by weight unsaturated polyester resin, about 40% by weight isophthalic polyester resin, and about 5% by weight amines, $C_{12}$-$C_{14}$ 0 tert-alkyl, ethoxylated, such as that as offered by Nyacol Technologies, Inc., under Nyacol® APE3040. Of course, other organic peroxides suitable for use within the methods and the panel member 10 as shown and described herein may also be utilized.

The fiber reinforcement material 32 preferably comprises a stranded material such as fiberglass, carbon fibers, or other fiber materials suitable for use within the methods and panels as described herein. Preferably, the fiber reinforcement material 32 comprises an E-glass, but may comprise an E-glass with an acid corrosion resistance of an E-CR glass.

As noted above, the core material is substantially rigid and may comprise a thermoplastic material 28, a flame retardant material 30, and a fiber reinforcement material 32 combined so as to meet Class I standard ASTM E84 testing. Specifically, the core member 26 may comprise a thermoplastic composite article including a porous layer comprising the plurality of reinforcement fibers 32, the thermoplastic material 28 and the compound flame retardant material 30. More specifically, the compounded flame retardant material 30 may comprise a hydroxide material compounded with a thermoplastic material and/or a second similar or non-similar thermoplastic material.

The method may also include placing a vacuum bag over the layers 11, 16, 18, 34, the core 30, and the mold, and evacuating the vacuum bag 70 to compress the layers 11, 16, 18, 34, and the core 26 with one another. The vacuum bag 70 may then be de-energized and removed 72 from about the layers 11, 16, 18, 34, the core 26, and the mold. The panel member 10 may then cure within the mold 74, prior to being removed therefrom 76, and trimmed, cut, shaped, and generally prepared for a particular application.

The overall panel member 10 is configured to have a Class I ASTM fire spread and smoke development rating, and specifically to have a flame spread index of less than or equal to 25 and a smoke development index of less than or equal to 450. The panel member may also be constructed to meet ASTM D790 flexural strength and flexural modulus requirements, as well as ASTM 630 tensile strength and tensile modulus requirements. The panel member 10 has a flexural strength preferably within a range between about 34 Mpa and about 50 Mpa, more preferably of between about 51 Mpa and about 70 Mpa, and most preferably of between about 60 Mpa and about 70 Mpa; a flexural modulus preferably within a range of between about 1330 Mpa and about 3650 Mpa, more preferably between about 2723 Mpa and about 3650 Mpa, and most preferably between about 3000 Mpa and about 3650 Mpa; a tensile strength within a range of between about 58 Mpa and about 70 Mpa, more preferably between about 62 Mpa and about 70 Mpa, and most preferably between about 65 Mpa and about 70 Mpa; and, a tensile modulus within a range of between about 5020 Mpa and about 3030 Mpa, more preferably of between about 5180 Mpa and about 6060 Mpa, and most preferably of between about 5500 Mpa and about 6060 Mpa.

While the panel member 10 may be constructed at various overall thicknesses, the panel 10 preferably has an overall thickness of about 5.0 mm or about 9.5 mm, with the first layer 11 and the second layer 16 having a combined thickness of about 0.016 inches, the third layer 18 having a thickness of about 0.025 inches, the core having a thickness of about 5.00 mm and of about 0.295 inches for a panel having an overall thickness of about 9.50 mm, and the fourth layer 34 having a thickness of about 0.025 inches.

Test Results

Test 1

Final Iteration
5.0 mm Panel

|  |  | Quantity (lbs.) | % of Total |
|---|---|---|---|
| Layer 1 | Gelcoat | 0.0958 | 98.23% |
|  | Catalyst | 0.00172 | 1.77% |
| Layer 2 | Gelcoat | 0.0879 | 98.23% |
|  | Catalyst | 0.00158 | 1.77% |
| Layer 3 | Resin | 0.2170 | 53.32% |
|  | Catalyst | 0.0039 | 0.96% |
|  | Mica | 0.0217 | 5.33% |
|  | Antimony Pentoxide | 0.0087 | 2.14% |
|  | Reinforcement | 0.1557 | 38.26% |
| Core | Core | 0.370 | 100.00% |
| Layer 5 | Resin | 0.2170 | 53.32% |
|  | Catalyst | 0.0039 | 0.96% |
|  | Mica | 0.0217 | 5.33% |
|  | Antimony Pentoxide | 0.0087 | 2.14% |
|  | Reinforcement | 0.1557 | 38.26% |
|  | E-84 Results | Flame Spread Index: 20 | Smoke Development Index: 300 |

Test 2

9.5 mm Panel

|  |  | Quantity (lbs.) | % Breakdown |
|---|---|---|---|
| Layer 1 | Gelcoat | 0.0958 | 98.23% |
|  | Catalyst | 0.00172 | 1.77% |
| Layer 2 | Gelcoat | 0.0879 | 98.23% |
|  | Catalyst | 0.00158 | 1.77% |
|  | Resin | 0.2278 | 53.41% |
|  | Catalyst | 0.0041 | 0.96% |
| Layer 3 | Mica | 0.0228 | 5.35% |
|  | Antimony Pentoxide | 0.0091 | 2.13% |
|  | Reinforcement | 0.1627 | 38.15% |
| Core | Core | 0.479 | 100.00% |
|  | Resin | 0.2278 | 53.41% |
|  | Catalyst | 0.0041 | 0.96% |
| Layer 5 | Mica | 0.0228 | 5.35% |
|  | Antimony Pentoxide | 0.0091 | 2.13% |
|  | Reinforcement | 0.1627 | 38.15% |
|  | E-84 Results | Flame Spread Index: 20 | Smoke Development Index: 300 |

Test 3

Prior Iteration (CHCHCO)
5.0 mm Panel

|  |  | Quantity (lbs.) | % Breakdown |
|---|---|---|---|
| Layer 1 | Gelcoat | 0.0958 | 98.23% |
| Layer 2 | Catalyst | 0.0017 | 1.77% |
|  | Gelcoat | 0.0879 | 98.23% |
| Layer 3 | Catalyst | 0.0016 | 1.77% |
|  | Resin | 0.2170 | 56.64% |
|  | Catalyst | 0.0039 | 1.02% |
|  | Antimony Pentoxide | 0.0065 | 1.70% |
|  | Reinforcement | 0.1557 | 40.64% |
| Core | Core | 0.3700 | 100.00% |
| Layer 5 | Resin | 0.2042 | 54.99% |
|  | Catalyst | 0.0049 | 1.33% |
|  | Antimony Pentoxide | 0.0065 | 1.75% |

-continued

Test 3

Prior Iteration (CHCHCO)
5.0 mm Panel

| | Quantity (lbs.) | % Breakdown |
|---|---|---|
| Reinforcement | 0.1557 | 41.93% |
| E-84 Results | Flame Spread Index: 20 | Smoke Development Index: 450 |

These and other features, advantages, and objects of the present invention will be further understood and appreciated by those skilled in the art by reference to the following specification, claims, and appended drawings.

The invention claimed is:

1. A method for producing a fire and smoke resistant panel member, comprising:
providing a mold;
applying a first layer to at least a portion of a surface of the mold, the first layer including a first pigmented polyester resin and a first organic peroxide,
applying a second layer to at least a portion of a surface of the first layer, the second layer including a second pigmented polyester resin and a second organic peroxide;
applying a third layer to at least a portion of a surface of the second layer, the third layer including a first polyester resin, a first flame retardant, a third organic peroxide, and a first fiber material;
applying a substantially rigid core member to at least a portion of a surface of the third layer; and
applying a fourth layer to at least a portion of a surface of the core member, the fourth layer including a second polyester resin, a second flame retardant, a fourth organic peroxide, and a second fiber material;
wherein the panel member is configured to have an ASTM E84 Class I fire and smoke rating.

2. The method of claim 1, wherein the panel member has a flexural strength of within a range of about 34 Mpa to about 70 Mps, and a flexural modulus of within a range of from about 1330 Mpa to about 3650 Mpa.

3. The method of claim 2, wherein the flexural strength is within the range of from about 51 Mpa to about 70 Mpa, and wherein the flexural modulus is within the range of from about 2723 to about 3650 Mpa.

4. The method of claim 3, wherein the flexural strength is within the range of from about 60 Mpa to about 70 Mpa, and wherein the flexural modulus is within the range of from about 3000 to about 3650 Mpa.

5. The method of claim 1, wherein the panel member has a tensile strength of within a range of from about 58 Mpa to about 70 Mpa, and a tensile modulus of within a range of from about 5020 Mpa to about 6060 Mpa.

6. The method of claim 5, wherein the tensile strength is within the range of from about 62 Mpa to about 70 Mpa, and the tensile modulus is within the range of from about 5180 Mpa to about 6060 Mpa.

7. The method of claim 6, wherein the tensile strength is within the range of from about 66 Mpa to about 70 Mpa, and the tensile modulus is within the range of from about 5500 Mpa to about 6060 Mpa.

8. The method of claim 1, wherein the panel member has a flexural strength of within a range of about 60 Mpa to about 70 Mps, a flexural modulus of within a range of from about 30000 Mpa to about 3650 Mpa, a tensile strength of within a range of from about 65 Mpa to about 70 Mpa, and a tensile modulus of within a range of from about 5500 Mpa to about 6060 Mpa.

9. The method of claim 1, wherein the first and/or the second fiber material comprises fiberglass.

10. The method of claim 1, wherein the core member comprises a thermoplastic material, a flame retardant material and a fiber reinforcement material.

11. The method of claim 1, wherein the second pigmented polyester resin is the same as the first pigmented polyester resin, the second and third organic peroxides are the same as the first organic peroxide, the second polymeric resin is the same as the first polymeric resin, and the second fiber material is the same as the first fiber material.

12. The method of claim 1, wherein the fire resistant panel is a laboratory wall panel.

13. The method of claim 1, further comprising:
off gassing the first layer prior to applying the third layer.

14. The method of claim 1, further comprising:
curing the first and second layer prior to applying the third layer.

15. A method for producing a fire and smoke resistant panel member, comprising:
providing a mold;
applying a first layer to at least a portion of a surface of the mold and second layer to at least a portion of a surface of the first layer, the first and second layers each comprising a pigmented polyester resin and a first organic peroxide;
providing a substantially rigid core member;
applying a third layer to at least a portion of a surface of the second layer and a fourth layer to at least a portion of a surface of the core member, the third and fourth layers each including a polyester resin, a flame retardant, a second organic peroxide, and a fiber material; and
applying the core member to at least a portion of a surface of the third layer before applying the fourth layer to the core member; and
wherein the panel member is configured to have a maximum flame spread index of less than or equal to 25 and a smoke development index of less than or equal to 450.

16. The method of claim 15, wherein the panel member has a flexural strength of within a range of about 34 Mpa to about 70 Mps, and a flexural modulus of within a range of from about 1330 Mpa to about 3650 Mpa.

17. The method of claim 16, wherein the flexural strength is within the range of from about 51 Mpa to about 70 Mpa, and wherein the flexural modulus is within the range of from about 2723 to about 3650 Mpa.

18. The method of claim 17, wherein the flexural strength is within the range of from about 60 Mpa to about 70 Mpa, and wherein the flexural modulus is within the range of from about 3000 to about 3650 Mpa.

19. The method of claim 15, wherein the panel member has a tensile strength of within a range of from about 58 Mpa to about 70 Mpa, and a tensile modulus of within a range of from about 5020 Mpa to about 6060 Mpa.

20. The method of claim 19, wherein the tensile strength is within the range of from about 62 Mpa to about 70 Mpa, and the tensile modulus is within the range of from about 5180 Mpa to about 6060 Mpa.

21. The method of claim 20, wherein the tensile strength is within the range of from about 66 Mpa to about 70 Mpa, and the tensile modulus is within the range of from about 5500 Mpa to about 6060 Mpa.

22. The method of claim 15, wherein the panel member has a flexural strength of within a range of about 60 Mpa to about 70 Mps, a flexural modulus of within a range of from about 30000 Mpa to about 3650 Mpa, a tensile strength of within a range of from about 65 Mpa to about 70 Mpa, and a tensile modulus of within a range of from about 5500 Mpa to about 6060 Mpa.

23. The method of claim 15, wherein the fiber material comprises fiberglass.

24. The method of claim 15, wherein the core member comprises a thermoplastic material, a flame retardant material and a fiber reinforcement material.

25. The method of claim 15, wherein the fire resistant panel is a laboratory wall panel.

26. The method of claim 15, further comprising:
off gassing the first layer prior to applying the third layer.

27. The method of claim 15, further comprising:
curing the first and second layer prior to applying the third layer.

* * * * *

UNITED STATES PATENT AND TRADEMARK OFFICE
CERTIFICATE OF CORRECTION

PATENT NO. : 11,319,704 B1
APPLICATION NO. : 16/880373
DATED : May 3, 2022
INVENTOR(S) : Ray, Sr.

It is certified that error appears in the above-identified patent and that said Letters Patent is hereby corrected as shown below:

In the Specification

Column 2, Line 42:
"proceeded" should be — preceded —

Column 2, Line 50:
"rating" should be — ratings —

Column 3, Lines 44 (2×), 45:
"mills" should be — mils —

Column 4, Line 4:
"comprises" should be — comprise —

Column 4, Line 30:
"compounded" should be — compound —

Column 6, Line 2:
After "about" insert -- 0.137 inches for a panel having an overall thickness of about --

In the Claims

Column 7, Claim 1, Line 23:
"," should be — ; —

Column 7, Claim 2, Line 42:
"Mps" should be — Mpa —

Column 7, Claim 3, Line 47:
After "2723" insert -- Mpa --

Signed and Sealed this
Twentieth Day of September, 2022

*Katherine Kelly Vidal*

Katherine Kelly Vidal
*Director of the United States Patent and Trademark Office*

CERTIFICATE OF CORRECTION (continued)
U.S. Pat. No. 11,319,704 B1

Column 7, Claim 4, Line 51:
After "3000" insert -- Mpa --

Column 7, Claim 8, Line 66:
"Mps" should be — Mpa —

Column 7, Claim 8, Line 67:
"30000" should be — 3000 —

Column 8, Claim 15, Line 48:
Delete "and"

Column 8, Claim 16, Line 58:
"Mps" should be — Mpa —

Column 8, Claim 17, Line 63:
After "2723" insert -- Mpa --

Column 8, Claim 18, Line 67:
After "3000" insert -- Mpa --

Column 9, Claim 22, Line 15:
"Mps" should be — Mpa —

Column 9, Claim 22, Line 16:
"30000" should be — 3000 —